United States Patent
Chen et al.

(10) Patent No.: US 11,405,923 B2
(45) Date of Patent: Aug. 2, 2022

(54) METHOD AND DEVICE FOR SENDING DOWNLINK CONTROL INFORMATION, AND METHOD AND DEVICE FOR DETECTING DOWNLINK CONTROL INFORMATION

(71) Applicant: ZTE CORPORATION, Guangdong (CN)

(72) Inventors: Yijian Chen, Guangdong (CN); Zhaohua Lu, Guangdong (CN); Yu Ngok Li, Guangdong (CN); Nan Zhang, Guangdong (CN)

(73) Assignee: ZTE CORPORATION

( * ) Notice: Subject to any disclaimer, the term of this patent is extended or adjusted under 35 U.S.C. 154(b) by 330 days.

(21) Appl. No.: 16/652,098

(22) PCT Filed: Sep. 30, 2018

(86) PCT No.: PCT/CN2018/109097
§ 371 (c)(1),
(2) Date: Mar. 30, 2020

(87) PCT Pub. No.: WO2019/063014
PCT Pub. Date: Apr. 4, 2019

(65) Prior Publication Data
US 2020/0314854 A1 Oct. 1, 2020

(30) Foreign Application Priority Data
Mar. 30, 2017 (CN) .......................... 201710939525.5

(51) Int. Cl.
*H04W 72/04* (2009.01)
*H04L 5/00* (2006.01)
*H04W 24/10* (2009.01)

(52) U.S. Cl.
CPC ....... *H04W 72/0493* (2013.01); *H04L 5/0051* (2013.01); *H04L 5/0098* (2013.01);
(Continued)

(58) Field of Classification Search
CPC ........... H04W 72/0493; H04W 72/042; H04W 72/0446; H04W 24/10; H04L 5/0051; H04L 5/0098
(Continued)

(56) References Cited

U.S. PATENT DOCUMENTS

2018/0338318 A1 11/2018 Yum et al.
2019/0007181 A1* 1/2019 Marinier ............... H04L 5/0091

FOREIGN PATENT DOCUMENTS

CN 106105353 11/2016
CN 108112088 6/2018
(Continued)

OTHER PUBLICATIONS

Patent Cooperation Treaty (PCT), International Search Report and Written Opinion for Application PCT/CN2018/109097 filed on Sep. 30, 2018, dated Jan. 4, 2019, International Searching Authority, CN.
(Continued)

*Primary Examiner* — Peter G Solinsky
(74) *Attorney, Agent, or Firm* — McDonald Hopkins LLC (57) ABSTRACT

Disclosed are a method and apparatus for transmitting downlink control information, and a method and apparatus for detecting downlink control information. The method for transmitting downlink control information includes: a base station configures available transmission resources of multiple types of long-term downlink control information, where in the multiple types of downlink control information, a subset relation exists between time domain resources of available transmission resources of at least two types of long-term downlink control information; the base station
(Continued)

A base station configures available transmission resources of multiple types of long-term downlink control information — S102

The base station transmits the multiple types of long-term downlink control information on the available transmission resources — S104 transmits the multiple types of long-term downlink control information on the available transmission resources.

20 Claims, 3 Drawing Sheets (52) U.S. Cl.
CPC ......... *H04W 24/10* (2013.01); *H04W 72/042* (2013.01); *H04W 72/0446* (2013.01)

(58) Field of Classification Search
USPC ........................................................ 370/329
See application file for complete search history.

(56) References Cited

FOREIGN PATENT DOCUMENTS

| EP | 3648527 | | 5/2020 | | |
|---|---|---|---|---|---|
| OA | 19011 A | * | 8/2017 | | |
| WO | 2016089119 | | 6/2016 | | |
| WO | 2017117424 | | 7/2017 | | |
| WO | WO-2017173033 A1 | * | 10/2017 | ........... | H04B 17/309 |
| WO | 2018171606 | | 9/2018 | | |

OTHER PUBLICATIONS

Ericsson, "On dynamic triggering for CSI reports and CSI-RS." R1-1716353. vol. RAN WG1, No. Nagoya, Japan. 2017.

Samsung et al., "Remaining issues on NR CSI-RS." R1-1707981. vol. Ran WG1, No. Hangzhou, China. 2017.

Extended European Search Report for Application 18860957.2, PCT/CN2018/109097, dated Jun. 21, 2021, 12 pgs., European Patent Office, Germany.

3 GPP TSG RAN WG1 Meeting NR#3, R1-1715437. "On transmission setting." Nagoya, Japan, Sep. 18-21, 2017. ZTE, SAnechips.

3 GPP TSG RAN WG1 Ad hoc Meeting, R1-1709993. "UE procedure of PDCCH monitoring for URLLC." Qingdao, China, Jun. 27-30, 2017. Huawei, HiSilicon.

Japanese Office Action dated Feb. 25, 2021; Japanese Patent Application No. 2020-518432.

* cited by examiner

METHOD AND DEVICE FOR SENDING DOWNLINK CONTROL INFORMATION, AND METHOD AND DEVICE FOR DETECTING DOWNLINK CONTROL INFORMATION

CROSS-REFERENCE TO RELATED APPLICATION

The present application is a 35 U.S.C. 371 national stage filing of PCT Application No. PCT/CN2018/109097 filed on Sep. 30, 2018, which claims priority to a Chinese patent application No. 201710939525.5 filed on Sep. 30, 2017, disclosures of each of which are incorporated herein by reference in their entireties.

TECHNICAL FIELD

The present disclosure relates to the field of communications and, for example, to a method and apparatus for transmitting downlink control information, and a method and apparatus for detecting downlink control information.

BACKGROUND

In a wireless communication system, a downlink physical layer control channel plays a very important role. Control information of the physical layer is mainly used to send downlink (DL) assignment to a user equipment (UE), so that the UE receives a downlink data channel, which carries, in addition to carrying data, some high-level signaling messages. The control information of the physical layer is used to send uplink (UL) grant to the UE, so that the UE sends an uplink data channel.

In 4G long term evolution (LTE), the control information of the physical layer may also be used to send aperiodic channel state information (CSI) reporting requests, notify of changes of a main control channel (MCCH), send uplink power control commands, send uplink hybrid automatic repeat request (HARQ) related information, and indicate a demodulation reference signal (DMRS) configuration.

In 5G new radio (NR) access technology, more functions have been added to control signaling, for example, triggering aperiodic or semi-persistent measurement pilots, such as a channel state information reference signal (CSI-RS) and sounding reference signal (SRS) of a channel; indicating physical resource block (PRB) bundling parameters; indicating transmission beams and quasi-co-location (QCL) relationship of reference signals, indicating uplink precoding and so on. Among these functions, some functions can affect multiple timeslots over a period of time.

Since there exists some important control information among the control information in 5G NR that may have a large influence on the subsequent long-term transmission, when the information is lost, inconsistencies in the information on the sender and receiver end occurs during the subsequent transmission period, which will cause the error to persist and cause serious performance loss.

SUMMARY

Embodiments of the present application provide a method and apparatus for transmitting downlink control information, and a method and apparatus for detecting downlink control information, so as to at least avoid system performance degradation caused by loss of downlink control information in the related art.

According to an embodiment of the present application, a method for transmitting downlink control information is provided. The method includes: a base station configures available transmission resources of multiple types of long-term downlink control information, where in the multiple types of downlink control information, a subset relation exists between time domain resources of available transmission resources of at least two types of long-term downlink control information; the base station transmits the multiple types of long-term downlink control information on the available transmission resources.

According to another embodiment of the present application, a method for detecting downlink control information is further provided. The method includes: a terminal detects multiple types of long-term downlink control information on available transmission resources of long-term downlink control information, where in the multiple types of long-term downlink control information, a subset relation exists between time domain resources of at least two types of long-term downlink control information.

According to yet another embodiment of the present application, an apparatus for transmitting downlink control information is provided. The apparatus includes: a configuration module, which is configured to configure available transmission resources of multiple types of long-term downlink control information, where in the multiple types of downlink control information, a subset relation exists between time domain resources of available transmission resources of at least two types of long-term downlink control information; a transmitting module, which is configured to transmit the multiple types of long-term downlink control information on the available transmission resources.

According to yet another embodiment of the present application, an apparatus for detecting downlink control information is further provided. The apparatus includes: a detecting module, which is configured to detect multiple types of long-term downlink control information on available transmission resources of long-term downlink control information, where in the multiple types of long-term downlink control information, a subset relation exists between time domain resources of at least two types of long-term downlink control information.

According to yet another embodiment of the present application, a signaling transmitting method is further provided. The method includes: a base station indicates activation of a transmission resource or instructs a terminal to start reporting measurement information through a first type of signaling; the base station indicates deactivation of the transmission resource or instructs the terminal to stop reporting the measurement information through a second type of signaling, where a number of timeslots included in an available transmission resource set of the first type of signaling is greater than or equal to a number of timeslots included in an available transmission resource set of the second type of signaling.

According to yet another embodiment of the present application, a signaling sending apparatus is further provided. The apparatus includes: a first indication module, which is configured to indicate activation of a transmission resource or instruct a terminal to start reporting measurement information through a first type of signaling; and a second indication module, which is configured to indicate deactivation of the transmission resource or instruct the terminal to stop reporting the measurement information through a second type of signaling; where a number of timeslots included in an available transmission resource set of the first type of signaling is greater than or equal to a number of timeslots included in an available transmission resource set of the second type of signaling.

BRIEF DESCRIPTION OF DRAWINGS

The drawings described herein are used to provide further understanding of the present application, and form a part of the present application. The exemplary embodiments and description thereof in the present application are used to explain the present application and do not limit the present application in any improper way. In the drawings.

DETAILED DESCRIPTION

The present application will be described hereinafter in detail through embodiments with reference to the drawings. It is to be noted that if not in collision, the embodiments and features therein in the present application may be combined with each other.

It is to be noted that the terms "first", "second" and the like in the description, claims and drawings of the present application are used to distinguish between similar objects and are not necessarily used to describe a particular order or sequence.

In the control information in 5G NR, there exists some important control information may have a large influence on the subsequent long-term transmission, when the information is lost, the receiving end does not realize that the information is lost. Therefore, inconsistencies in the information on the sender and receiver end occurs during the subsequent transmission period.

For example, in beam switching, a base station may notify of switch signaling through downlink control information (DCI). If the downlink control information is not received at this time, the transmission beam may be misunderstood for some time after the beam switching.

Another example is that a base station performs uplink power control through DCI. When the downlink control information is not received, the base station considers that a terminal has adjusted the transmit power, but the terminal actually has not adjusted the transmit power. At this time, some judgments made by the base station on the uplink transmission will cause problems, and incorrect uplink scheduling, modulation and coding scheme (MCS) determination, and layer determination may occur.

Another example is that a base station activates semi-persistent measurement pilot transmission. When this information is not received, a terminal will not correctly perform rate matching, the transmitted pilot will be interpreted as data information, and downlink demodulation performance is affected. This situation also occurs when the semi-persistent measurement pilot is deactivated.

Some other impacts also exist, such as the loss of reporting information of activating or deactivating semi-persistent CSI by the base station, the loss of precoding information for multiple timeslots, and the loss of PRB bundling information for multiple timeslots. When such control information that affects multiple timeslots is lost, asymmetry in the understanding of the transmitting and receiving ends occurs, and serious system performance degradation is caused.

Figure 1:
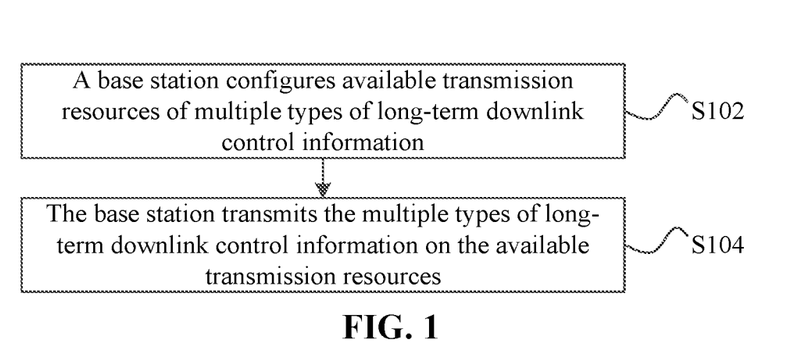
FIG. 1 is a flowchart of a method for transmitting downlink control information according to an embodiment of the present application.

A method for transmitting downlink control information is provided in an embodiment. As shown in FIG. 1, a process includes the following steps S102 and S104. In step S102, a base station configures available transmission resources of multiple types of long-term downlink control information.

In multiple types of long-term downlink control information, a subset relation exists between time domain resources of available transmission resources of at least two types of long-term downlink control information.

In step 104, the base station transmits the multiple types of long-term downlink control information on the available transmission resources of the multiple types of long-term downlink control information.

In an embodiment, when multiple types of long-term control information are transmitted, since limitation of a subset relation of the time domain resources exists and the multiple types of long-term control information are located in a same timeslot, conflict caused when different types of downlink control information are updated is avoided.

In an embodiment, the subset relation between the multiple types of long-term control information includes at least one of the following: the time domain resources of the available transmission resources of the at least two types of long-term downlink control information have a same period or an integer multiple relationship exists in periods of the time domain resources of the available transmission resources of the at least two types of long-term downlink control information; or the time domain resources of the available transmission resources of the at least two types of long-term downlink control information have a same offset.

In an embodiment, the multiple types of long-term downlink control information includes at least two of following types of long-term downlink control information: a first type of long-term downlink control information, which is beam indication signaling or QCL relationship indication signaling; a second type of long-term downlink control information, which is activation signaling or deactivation signaling for transmitting a semi-persistent measurement pilot; and a third type of long-term downlink control signaling, which is activation signaling or deactivation signaling for reporting semi-persistent CSI.

In an embodiment, a relationship of the first type of long-term downlink control information, the second type of long-term downlink control information, and the third type of long-term downlink control information includes at least one of the following: a timeslot resource set of available transmission resources of the third type of long-term downlink control information is a subset of a timeslot resource set of available transmission resources of the second type of long-term downlink control information; or a timeslot resource set of available transmission resources of the second type of long-term downlink control information is a subset of a timeslot resource set of available transmission resources of the first type of long-term downlink control information.

In an embodiment, the multiple types of long-term downlink control information includes one of the second type of long-term downlink control information or the third type of long-term downlink control information, where a subframe set of available transmission resources of the deactivation signaling is a subset of a subframe set of available transmission resources for the activation signaling; or the subframe set of the available transmission resources of the deactivation signaling is determined according to a transmission position of a channel state information reference signal; or the subframe set of the available transmission resources of the deactivation signaling is determined according to a measurement feedback configuration of channel state information of the channel state information reference signal.

In an embodiment, measurement signaling of the semi-persistent channel state information and the deactivation signaling of the semi-persistent channel state information are transmitted simultaneously by using same signaling.

Figure 2:
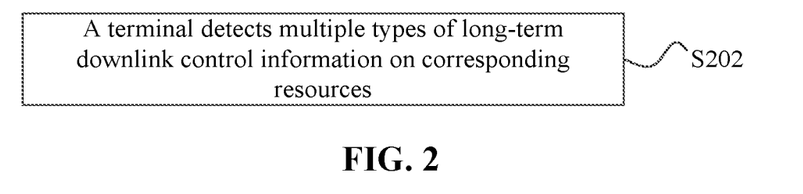
FIG. 2 is a flowchart of a method for detecting downlink control information according to an embodiment of the present application.

In an embodiment, a method for detecting downlink control information is provided. As shown in FIG. 2, a process includes the following step S202.

In step 202, a base station detects multiple types of long-term downlink control information on corresponding resources.

In multiple types of long-term downlink control information, a subset relation exists between time domain resources of at least two types of long-term downlink control information.

In an embodiment, the subset relation between the multiple types of long-term control information includes at least one of the following: the time domain resources of the available transmission resources of the at least two types of long-term downlink control information have a same period or an integer multiple relationship exists in periods of the time domain resources of the available transmission resources of the at least two types of long-term downlink control information; or the time domain resources of the available transmission resources of the at least two types of long-term downlink control information have a same offset.

In an embodiment, the multiple types of long-term downlink control information includes at least two of following types of long-term downlink control information: a first type of long-term downlink control information, which is beam indication signaling or QCL relationship indication signaling; a second type of long-term downlink control information, which is activation signaling or deactivation signaling for transmitting a semi-persistent measurement pilot; and a third type of long-term downlink control signaling, which is activation signaling or deactivation signaling for reporting semi-persistent CSI.

In an embodiment, a relationship of the first type of long-term downlink control information, the second type of long-term downlink control information, and the third type of long-term downlink control information includes at least one of the following: a timeslot resource set of available transmission resources of the third type of long-term downlink control information is a subset of a timeslot resource set of available transmission resources of the second type of long-term downlink control information; or a timeslot resource set of available transmission resources of the second type of long-term downlink control information is a subset of a timeslot resource set of available transmission resources of the first type of long-term downlink control information.

In an embodiment, multiple types of long-term downlink control information detected by the terminal on the transmission resources of long-term downlink control information has following two types of formats: a first type of format, which contains short-term downlink control information; and a second type of format, which contains short-term downlink control information and long-term downlink control information.

In an embodiment, for the multiple types of long-term downlink control information transmitted simultaneously, a terminal performs combined response to the multiple types of long-term downlink control information in uplink signaling.

Figure 3:
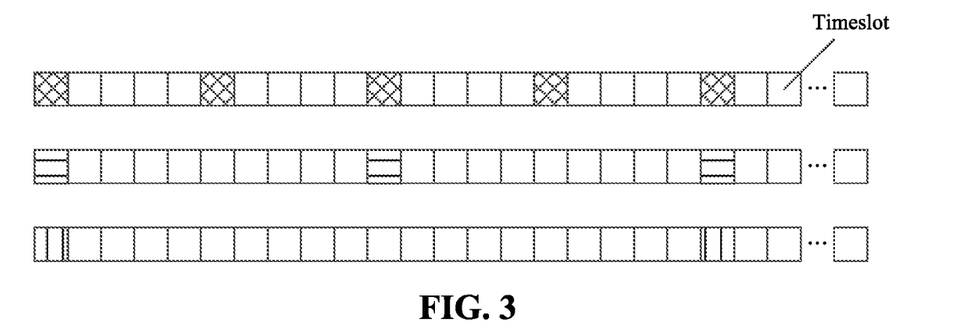
FIG. 3 is a schematic diagram of a configuration of available transmission resources of downlink control information according to an embodiment of the present application.

FIG. 3 is a schematic diagram of a configuration of available transmission resources of downlink control information according to an embodiment of the present application.

In an embodiment, a base station configures available transmission resources for multiple types of long-term control information, or transmitting and receiving ends agree on the available transmission resources. Then the base station transmits the multiple types of long-term downlink control information on the available transmission resources to the receiving ends. The following describes the embodiment in detail from the aspects of transmission resource configuration and DCI detection.

(1) Transmission Resource Configuration

In the multiple types of long-term control information, available transmission time domain resources of at least two types of long-term control information have following two subset relations.

1. The period of resources is the same or an integer multiple relationship exists.

2. The available transmission time domain resources of the multiple types of long-term downlink control information have a same offset.

As shown in FIG. 3, multiple types of long-term control information configured by the base station includes three types of long-term control information, where a first type of long-term downlink control information is beam indication signaling or QCI relationship indication signaling; a second type of long-term downlink control information is activation signaling or deactivation signaling for transmitting a semi-persistent measurement pilot; and a third type of long-term downlink control signaling is activation signaling or deactivation signaling for reporting semi-persistent CSI.

In FIG. 3, available transmission slot resources of the third type of long-term control information is a subset of available transmission slot resources of the second type of long-term control information, and the available transmission slot resources of the second type of long-term control information is a subset of available transmission slot resources of the first type of long-term control information.

(2) DCI Detection

In order to save overhead, the base station does not need to transmit in every resource location that is available for transmission of long-term DCI information. If no change exists in demand, the base station may not transmit. Therefore, the terminal needs to detect multiple types of downlink control information format (DCI format) in a timeslot in which long-term DCI information may occur.

This embodiment provides two types of DCI formats. A first type of format contains short-term DCI information. A second type of format contains short-term DCI information and long-term DCI information.

Figure 4:
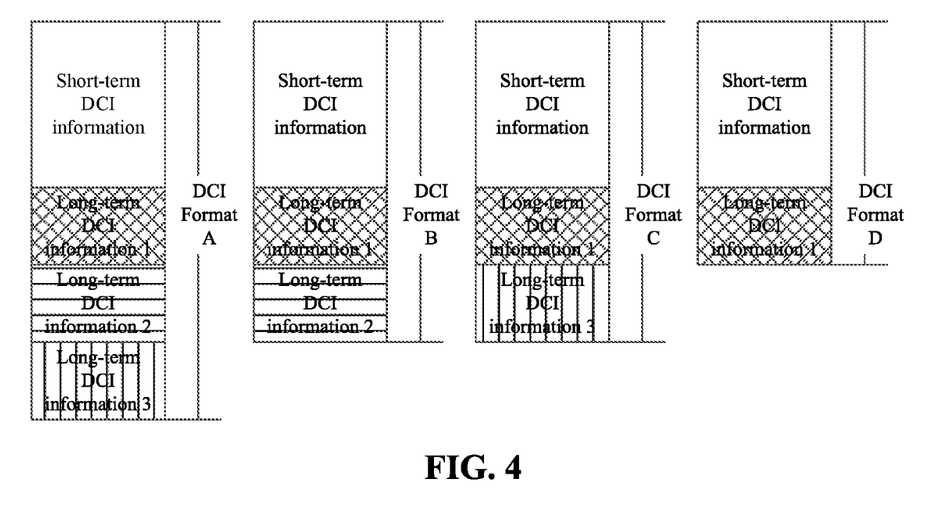
FIG. 4 is a schematic diagram of a format of downlink control information according to an embodiment of the present application.

When the long-term DCI information is specifically transmitted, the format used may be determined according to a configuration of transmission resources of the long-term DCI information. FIG. 4 shows four different available DCI formats for the second type of DCI format.

In DCI format A, short-term DCI information and three different types of long-term DCI information (long-term DCI information 1, DCI information 2 and DCI information 3) are included. In DCI format B, short-term DCI information and two different types of long-term DCI information (long-term DCI information 1 and DCI information 2) are included. In DCI format C, short-term DCI information and two different types of long-term DCI information (long-term DCI information 1 and DCI information 3) are included. In DCI format D, short-term DCI information and long-term DCI information 1 are included.

The semi-persistent CSI-RS means that the base station periodically transmits a CSI-RS according to a configured resource location within a time range corresponding to an activation period.

In an embodiment, the activation of the semi-persistent CSI-RS may be more flexible. For example, the activation may be performed in any slot, and the deactivation of the semi-persistent CSI-RS needs to be limited in a specific subframe.

In an embodiment, a subframe set that can transmit deactivation signaling is a subset of a subframe set that can transmit activation signaling, or the subframe set that can send deactivation signaling needs to be determined according to a transmission position of the CSI-RS; or the subframe set that can transmit deactivation signaling needs to be determined according to the CSI measurement feedback configuration for the CSI-RS.

In addition, if a semi-persistent CSI measurement for the CSI-RS exists, the deactivation signaling of the CSI-RS should be transmitted at the same time. It may be agreed to use same signaling.

According to an embodiment of the present application, a signaling transmitting method is further provided. The method includes: a base station indicates activation of a transmission resource or instructs a terminal to start reporting through a first type of signaling; the base station indicates deactivation of the transmission resource or instructs the terminal to stop reporting through a second type of signaling; and a number of timeslots included in an available transmission resource set of the first type of signaling is greater than or equal to a number of timeslots included in an available transmission resource set of the second type of signaling (that is, sending flexibility of the first type of signaling is greater than or equal to the sending flexibility of the second type of signaling).

Figure 5:
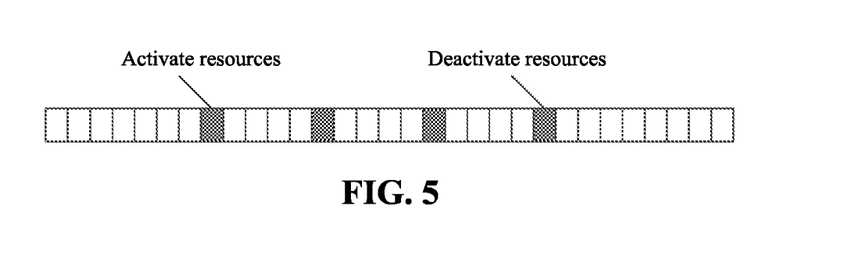
FIG. 5 is a schematic diagram of a configuration of instruction transmission resources according to an embodiment of the present application.

In an embodiment, the first type of signaling is one of the following: physical layer signaling, media access control signaling, or radio resource control signaling; and the second type of signaling is one of the following: the physical layer signaling, the media access control signaling, or the radio resource control signaling. FIG. 5 is a schematic diagram of a configuration of instruction transmission resources according to an embodiment. As shown in FIG. 5, a base station configures periodic pilot resources, such as a period of 5 ms. When these resources are not activated, these resources may be used for data transmission. When these resources are activated, these resources may be used for pilot transmission. A base station activates pre-configured pilot resources through a first type of signaling. After receiving the first type of signaling, a terminal will know that the base station will start transmitting a pilot signal at a period of 5 ms. Before receiving deactivation signaling, the terminal always thinks that the base station is sending the pilot signal. The base station may deactivate the pilot resources through a second type of signaling. Generally speaking, activation needs to have high flexibility to meet the requirements of fast measurement, while deactivation requires less flexibility of signaling. In order to save precious signaling overhead as much as possible, following methods may be used.

In an embodiment, the types of the first type signaling and the second type signaling may have following six combinations.

The first type of signaling is physical layer signaling, the second type of signaling is media access control (MAC) signaling; the first type of signaling is physical layer signaling, the second type of signaling is radio resource control (RRC) signaling; the first type of signaling is physical layer signaling, the second type of signaling is MAC signaling or RRC signaling; the first type of signaling is physical layer signaling, the second type of signaling is physical layer signaling, MAC signaling or RRC signaling; the first type of signaling is MAC signaling, the second type of signaling is RRC signaling; or the first type of signaling is physical layer signaling or MAC signaling, the second type of signaling type is MAC signaling or RRC signaling.

In an embodiment, the base station may also configure periodic reporting, including channel quality information or other measurement information. Instructing to trigger and stopping the reporting through the periodic reporting are similar to resource activation and deactivation.

From the description of the embodiment described above, it will be apparent to those skilled in the art that the methods in the embodiment described above may be implemented by software plus a necessary general-purpose hardware platform, or may of course be implemented by hardware. Based on this understanding the present application substantially, or the part contributing to the existing art, may be embodied in the form of a software product. The computer software product is stored in a storage medium (such as ROM or RAM, a magnetic disk and an optical disk) and the storage medium includes several instructions for enabling a terminal device (which may be a mobile phone, a computer, a server, a network device, or the like) to perform the method according to multiple embodiments of the present application.

In an embodiment, a base station of downlink control information transmitting end and a terminal of downlink control information detecting end are also provided. The base station and the terminal are respectively used to implement the above embodiments and application implementations of the transmitting end and the detecting end. The description which already has been explained will not be described in detail. As used below, the term "module" may be software, hardware or a combination thereof capable of implementing predetermined functions. The apparatus in the embodiment described below is preferably implemented by software, but implementation by hardware or by a combination of software and hardware is also possible and conceived.

Figure 6:
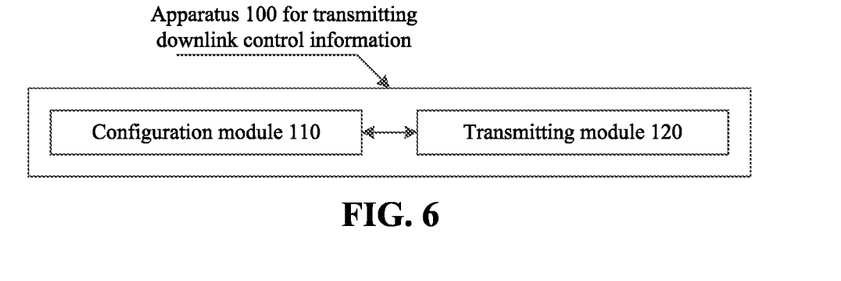
FIG. 6 is a structural block diagram of a base station according to an embodiment of the present application.

FIG. 6 is a structural block diagram of an apparatus for transmitting downlink control information according to an embodiment of the present application. As shown in FIG. 6, the transmitting apparatus 100 includes a configuration module 110, which is configured to configure available transmission resources of multiple types of long-term downlink control information, where in the multiple types of long-term downlink control information, a subset relation exists between time domain resources of available transmission resources of at least two types of long-term downlink control information; and a transmitting module 120, which is configured to transmit the multiple types of long-term downlink control information on the available transmission resources.

In an embodiment, the subset relation includes at least one of the following: the time domain resources of the available transmission resources of the at least two types of long-term downlink control information have a same period or an integer multiple relationship exists in periods of the time domain resources of the available transmission resources of the at least two types of long-term downlink control information; or the time domain resources of the available transmission resources of the at least two types of long-term downlink control information have a same offset.

In an embodiment, the multiple types of long-term downlink control information includes at least two of following types of long-term downlink control information: a first type of long-term downlink control information, which is beam indication signaling or QCL relationship indication signaling; a second type of long-term downlink control information, which is activation signaling or deactivation signaling for transmitting a semi-persistent measurement pilot; and a third type of long-term downlink control signaling, which is activation signaling or deactivation signaling for reporting semi-persistent CSI. In an embodiment, the apparatus for transmitting the downlink control information in the above embodiments may be a base station or a functional component of the base station. The base station includes a processor and a corresponding memory. A configuration module of the apparatus for transmitting the downlink control information may be a functional module stored in the memory, where the functional module, when execute by a processor, implements corresponding steps or operations, and the functions of a transmitting module of the apparatus for transmitting the downlink control information may be implemented by a transceiver of the base station.

Figure 7:
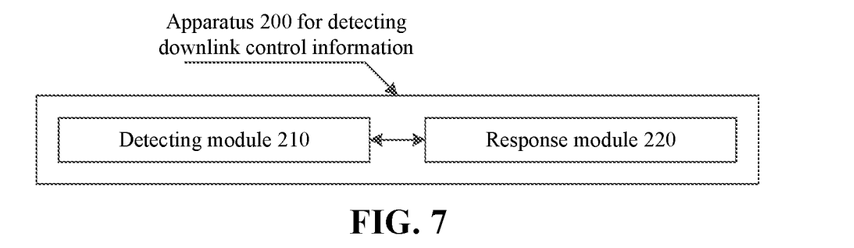
FIG. 7 is a structural block diagram of a terminal according to an embodiment of the present application.

FIG. 7 is a structural block diagram of an apparatus for detecting downlink control information according to an embodiment of the present application. As shown in FIG. 7, the detecting apparatus 200 includes a detecting module 210, which is configured to detect multiple types of long-term downlink control information on corresponding resources, where in the multiple types of long-term downlink control information, a subset relation exists between time domain resources of available transmission resources of at least two types of long-term downlink control information.

In an embodiment, formats of downlink control information detected by the detecting apparatus 210 include following two types of formats: a first type of format, which contains short-term downlink control information; and a second type of format, which contains short-term downlink control information and long-term downlink control information.

In an embodiment, the detecting apparatus 200 further includes a response module 220, which is configured to, when the detected the multiple types of long-term downlink control information are transmitted together, perform a combined response to the multiple types of long-term downlink control information in uplink signaling.

In an embodiment, the apparatus for detecting downlink control information in the above embodiment may be a user terminal or a functional component of the user terminal. The terminal includes a processor and a corresponding memory. The detecting module of the detecting apparatus may be function modules stored in the memory. The processor executes these function modules to implement corresponding steps or operations, and functions of receiving downlink control information and transmitting uplink signaling to respond may be implemented by a radio frequency module in the user terminal.

It is to be noted that the multiple modules described above may be implemented by software or hardware. Implementation by hardware may, but may not necessarily, be performed in the following manners: the various modules described above are located in a same processor, or the multiple modules described above are located in their respective processors in any combination form.

According to another embodiment of the present application, a processor is further provided. The processor is configured to run programs stored in the memory to implement the methods of above embodiments.

According to another embodiment of the present application, a storage medium is further provided. The storage medium is configured to store program codes for executing steps of above embodiments.

In an embodiment, the above storage medium may include, but is not limited to, a USB flash disk, a read-only memory (ROM), a random access memory (RAM), a mobile hard disk, a magnetic disk, an optical disk or another medium capable of storing program codes.

For specific examples in the embodiment, reference may be made to the examples described in the above embodiments and application embodiments, and the examples will not be repeated in the embodiment.

Obviously, it should be understood by those skilled in the art that multiple above-mentioned modules or steps of the present application may be implemented by a general-purpose computing apparatus, the modules or steps may be concentrated on a single computing apparatus or distributed on a network composed of multiple computing apparatuses. In an embodiment, each of the modules or steps of the present application may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any specific combination of hardware and software.

What is claimed is:

1. A method for transmitting downlink control information, comprising:
configuring, by a base station, available transmission resources of a plurality of types of long-term downlink control information, wherein in the plurality of types of long-term downlink control information, a subset relation exists between time domain resources of available transmission resources of at least two types of long-term downlink control information; and
transmitting, by the base station, the plurality of types of long-term downlink control information on the available transmission resources of the plurality of types of long-term downlink control information.

2. The method of claim 1, wherein the subset relation comprises at least one of:

the time domain resources of the available transmission resources of the at least two types of long-term downlink control information have a same period;

an integer multiple relationship exists in periods of the time domain resources of the available transmission resources of the at least two types of long-term downlink control information; or the time domain resources of the available transmission resources of the at least two types of long-term downlink control information have a same offset.

3. The method of claim 1, wherein the plurality of types of long-term downlink control information comprises at least two of following types of long-term downlink control information:

a first type of long-term downlink control information, which is beam indication signaling or quasi-co-location relationship indication signaling;

a second type of long-term downlink control information, which is activation signaling or deactivation signaling for transmitting a semi-persistent measurement pilot; and a third type of long-term downlink control signaling, which is activation signaling or deactivation signaling for reporting semi-persistent channel state information.

4. The method of claim 3, wherein a relationship of the first type of long-term downlink control information, the second type of long-term downlink control information, and the third type of long-term downlink control information comprises at least one of the following:

a timeslot resource set of available transmission resources of the third type of long-term downlink control information is a subset of a timeslot resource set of available transmission resources of the second type of long-term downlink control information; or a timeslot resource set of available transmission resources of the second type of long-term downlink control information is a subset of a timeslot resource set of available transmission resources of the first type of long-term downlink control information.

5. The method of claim 3, wherein the plurality of types of long-term downlink control information comprises one of the second type of long-term downlink control information or the third type of long-term downlink control information, wherein, a subframe set of available transmission resources of the deactivation signaling is a subset of a subframe set of available transmission resources for the activation signaling; or the subframe set of the available transmission resources of the deactivation signaling is determined according to a transmission position of a channel state information reference signal; or the subframe set of the available transmission resources of the deactivation signaling is determined according to a measurement feedback configuration of channel state information of the channel state information reference signal.

6. The method of claim 3, wherein measurement signaling of the semi-persistent channel state information and the deactivation signaling of the semi-persistent channel state information are transmitted simultaneously by using same signaling.

7. A method for detecting downlink control information, comprising:

detecting, by a terminal, a plurality of types of long-term downlink control information on transmission resources of long-term downlink control information, wherein in the plurality of types of long-term downlink control information, a subset relation exists between time domain resources of at least two types of long-term downlink control information.

8. The method of claim 7, wherein the subset relation comprises at least one of:

the time domain resources of the available transmission resources of the at least two types of long-term downlink control information have a same period;

an integer multiple relationship exists in periods of the time domain resources of the available transmission resources of the at least two types of long-term downlink control information; or the time domain resources of the available transmission resources of the at least two types of long-term downlink control information have a same offset.

9. The method of claim 7, wherein the plurality of types of long-term downlink control information comprises at least two of following types of long-term downlink control information:

a first type of long-term downlink control information, which is beam indication signaling or quasi-co-location relationship indication signaling;

a second type of long-term downlink control information, which is activation signaling or deactivation signaling for transmitting a semi-persistent measurement pilot; and a third type of long-term downlink control signaling, which is activation signaling or deactivation signaling for reporting semi-persistent channel state information.

10. The method of claim 9, wherein a relationship of the first type of long-term downlink control information, the second type of long-term downlink control information, and the third type of long-term downlink control information comprises at least one of the following:

a timeslot resource set of available transmission resources of the third type of long-term downlink control information is a subset of a timeslot resource set of available transmission resources of the second type of long-term downlink control information; or a timeslot resource set of available transmission resources of the second type of long-term downlink control information is a subset of a timeslot resource set of available transmission resources of the first type of long-term downlink control information.

11. The method of claim 7, wherein the plurality of types of long-term downlink control information detected by the terminal on the transmission resources of long-term downlink control information has following two types of formats:

a first type of format, which contains short-term downlink control information; and a second type of format, which contains short-term downlink control information and long-term downlink control information.

12. The method of claim 11, wherein, for the plurality of types of long-term downlink control information transmitted simultaneously, the terminal performs combined response to the plurality of types of long-term downlink control information in uplink signaling.

13. An apparatus for transmitting downlink control information, comprising:

a processor; and a memory for storing instructions executable by the processor, wherein when executing the instructions the processor is configured to:

configure available transmission resources of a plurality of types of long-term downlink control information, wherein in the plurality of types of long-term downlink control information, a subset relation exists between time domain resources of available transmission resources of at least two types of long-term downlink control information; and transmit the plurality of types of long-term downlink control information on the available transmission resources.

14. The apparatus of claim 13, wherein the subset comprises at least one of:

the time domain resources of the available transmission resources of the at least two types of long-term downlink control information have a same period;

an integer multiple relationship exists in periods of the time domain resources of the available transmission resources of the at least two types of long-term downlink control information; or the time domain resources of the available transmission resources of the at least two types of long-term downlink control information have a same offset.

15. The apparatus of claim 13, wherein the plurality of types of long-term downlink control information comprises at least two of following types of long-term downlink control information:

a first type of long-term downlink control information, which is beam indication signaling or quasi-co-location relationship indication signaling;

a second type of long-term downlink control information, which is activation signaling or deactivation signaling for transmitting a semi-persistent measurement pilot; and a third type of long-term downlink control signaling, which is activation signaling or deactivation signaling for reporting semi-persistent channel state information.

16. An apparatus for detecting downlink control information, comprising:

a processor; and a memory for storing instructions executable by the processor, wherein when executing the instructions the processor is configured to:

detect a plurality of types of long-term downlink control information on transmission resources of long-term downlink control information, wherein in the plurality of types of long-term downlink control information, a subset relation exists between time domain resources of at least two types of long-term downlink control information.

17. The apparatus of claim 16, wherein the subset relation comprises at least one of:

the time domain resources of the available transmission resources of the at least two types of long-term downlink control information have a same period;

an integer multiple relationship exists in periods of the time domain resources of the available transmission resources of the at least two types of long-term downlink control information; or the time domain resources of the available transmission resources of the at least two types of long-term downlink control information have a same offset.

18. The apparatus of claim 16, wherein the plurality of types of long-term downlink control information comprises at least two of following types of long-term downlink control information:

a first type of long-term downlink control information, which is beam indication signaling or quasi-co-location relationship indication signaling;

a second type of long-term downlink control information, which is activation signaling or deactivation signaling for transmitting a semi-persistent measurement pilot; and a third type of long-term downlink control signaling, which is activation signaling or deactivation signaling for reporting semi-persistent channel state information.

19. The apparatus of claim 16, wherein the plurality of types of long-term downlink control information detected by the terminal on the transmission resources of long-term downlink control information has following two types of formats:

a first type of format, which contains short-term downlink control information; and a second type of format, which contains short-term downlink control information and long-term downlink control information.

20. The apparatus of claim 19, wherein the processor is further configured to:

in a case where the detected the plurality of types of long-term downlink control information are transmitted simultaneously, performing a combined response to the plurality of types of long-term downlink control information in uplink signaling.

\* \* \* \* \*